United States Patent [19]
Kaite et al.

[11] Patent Number: 5,955,868
[45] Date of Patent: Sep. 21, 1999

[54] BATTERY CHARGING APPARATUS HAVING BATTERY ATTACHMENT SECTIONS FOR CHARGING BATTERIES AT DIFFERENT RATES OR TIMING

[75] Inventors: Osamu Kaite; Toshiharu Kokuga, both of Tsuna-gun, Japan

[73] Assignee: Sanyo Electric Co., Ltd., Moriguchi, Japan

[21] Appl. No.: 09/044,186

[22] Filed: Mar. 19, 1998

[30] Foreign Application Priority Data

Mar. 21, 1997 [JP] Japan .................................. 9-068328

[51] Int. Cl.⁶ .................................................. H01M 10/46
[52] U.S. Cl. ............................................ 320/119; 320/125
[58] Field of Search ..................................... 320/106, 107, 320/110, 112, 116, 118, 119, 125, 160, FOR 101, FOR 105, FOR 114, FOR 119, FOR 121, FOR 147, DIG. 12, DIG. 19, DIG. 21

[56] References Cited

U.S. PATENT DOCUMENTS

| | | | |
|---|---|---|---|
| 5,057,761 | 10/1991 | Felegyhazi, Sr. .................... | 320/110 |
| 5,057,762 | 10/1991 | Goedken et al. .................... | 320/116 |
| 5,523,668 | 6/1996 | Feldstein ............................ | 320/118 |
| 5,539,297 | 7/1996 | Fiebig ................................ | 320/126 |
| 5,602,455 | 2/1997 | Stephens et al. ................... | 320/106 |
| 5,629,601 | 5/1997 | Feldstein ............................ | 320/119 |

FOREIGN PATENT DOCUMENTS 64-19923  1/1989  Japan .

Primary Examiner—Edward H. Tso
Attorney, Agent, or Firm—Wenderoth, Lind & Ponack, L.L.P.

[57] ABSTRACT

The battery charging apparatus is provided with a charging power supply for electric power to charge rechargeable batteries, a first battery attachment section positioned close to the power supply, a second battery attachment section positioned further away from the power supply, and a charging controller which fully charges a rechargeable battery in the first battery attachment section faster than a rechargeable battery in the second battery attachment section.

17 Claims, 3 Drawing Sheets

BATTERY CHARGING APPARATUS HAVING BATTERY ATTACHMENT SECTIONS FOR CHARGING BATTERIES AT DIFFERENT RATES OR TIMING

BACKGROUND OF THE INVENTION

This invention relates to a battery charging apparatus for charging a rechargeable battery.

Rechargeable batteries such as nickel cadmium batteries, nickel hydrogen batteries, etc., which can be used repeatedly, are widely employed as a power source for portable electronic equipment. These rechargeable batteries are charged by attachment to a battery charging apparatus. During charging, rechargeable batteries are subject to self heating and the effects of heat radiated from the power supply and other circuits of the charging apparatus. It is possible for the batteries to be put in an abnormally high temperature state.

If a rechargeable battery is subjected to abnormally high temperature, battery characteristics will be degraded. To avoid abnormally high rechargeable battery temperature, battery temperature is monitored and charging is interrupted when battery temperature exceeds a specified value as disclosed in Japanese Non-examined Patent Publication No. 64-19923 issued on Jan. 24, 1989. In this disclosure, charging is resumed when rechargeable battery temperature again drops below the specified temperature.

However, the purpose of the above technology is to prevent degradation of battery characteristics. Therefore, no consideration is given to rechargeable battery temperature when full charge is reached. Consequently, when a rechargeable battery reaches full charge, it has become hot. When an attempt is made to remove the battery from the charging apparatus, the undesirable impression is made that either the charging apparatus or the rechargeable battery has a problem.

Thus it is an object of the present invention to avoid having the rechargeable battery in a high temperature state when it has reached full charge and is ready to be removed from the charging apparatus.

SUMMARY OF THE INVENTION

When a rechargeable battery has reached full charge and the full charge indicator is displayed, the present invention avoids abnormally high temperature states of the rechargeable battery.

The charging apparatus of the present invention is provided with a charging power supply to supply power to rechargeable batteries, a first battery attachment section disposed in close proximity to the charging power supply, a second battery attachment section disposed at a distance from the charging power supply, and a charging controller to fully charge a rechargeable battery in the first battery attachment section faster than that in the second battery attachment section.

Further, the charging apparatus of the present invention is provided with a charging power supply to supply power to a rechargeable battery, a battery attachment section for attaching the rechargeable battery, and a charging indicator to display the state of charge of the rechargeable battery in the battery attachment section. The charging indicator displays full charge of the rechargeable battery after a prescribed time interval after the rechargeable battery has reached full charge.

Still further, the charging apparatus of the present invention is provided with a charging power supply to supply power to a rechargeable battery, a battery attachment section for attaching the rechargeable battery, a temperature sensor to measure the temperature of the rechargeable battery in the battery attachment section, and a charging indicator to display the state of charge of the rechargeable battery in the battery attachment section. The charging indicator displays full charge of the rechargeable battery after the rechargeable battery has reached full charge and after the temperature sensor has measured rechargeable battery temperature below a prescribed temperature.

The above and further objects and features of the invention will more fully be apparent from the following detailed description with accompanying drawings.

DETAILED DESCRIPTION OF THE INVENTION

Figure 1:
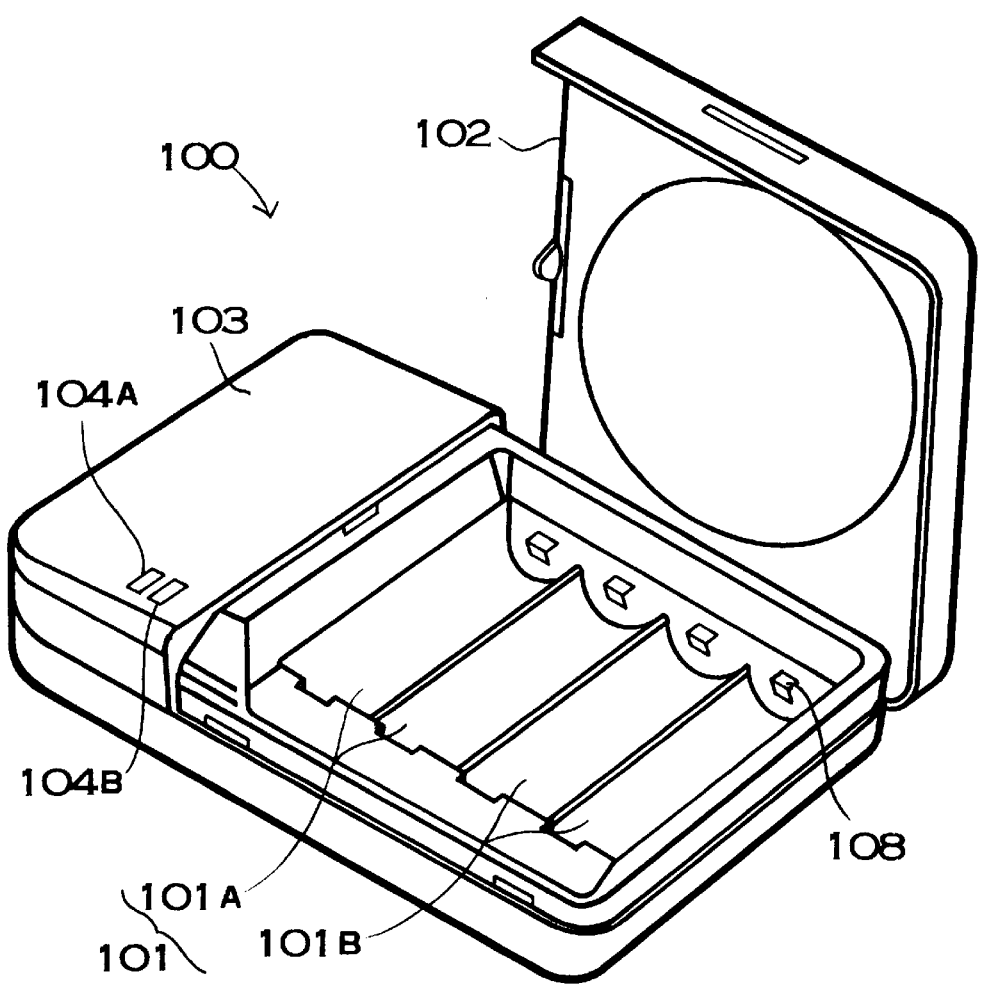
FIG. 1 is an oblique view showing an embodiment of the present invention.
Figure 2:
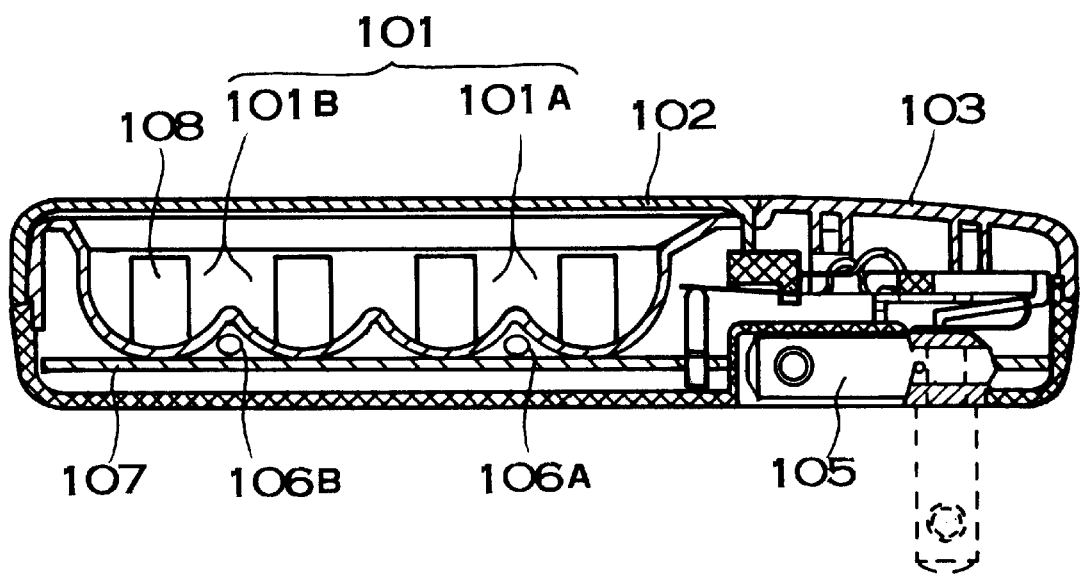
FIG. 2 is a longitudinal cross-section view for an embodiment of the present invention shown in FIG. 1.
Figure 3:
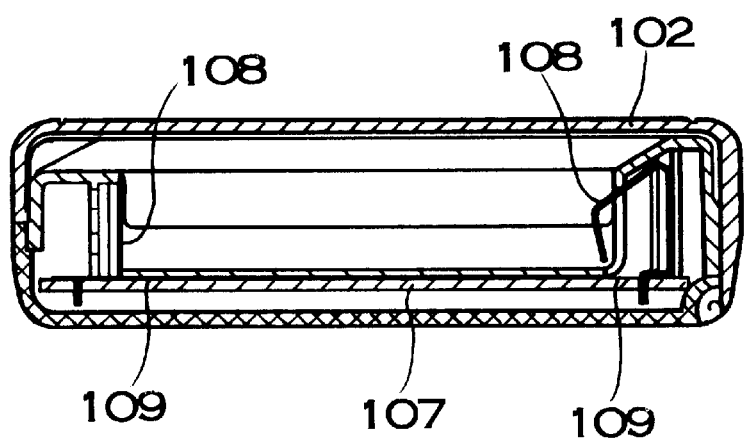
FIG. 3 is a lateral cross-section view of the embodiment of the present invention shown in FIG. 1.

Turning to FIGS. 1 through 3, an embodiment of the charging apparatus of the present invention is shown. In these figures, 100 is the body of the charging apparatus, and 101 is the battery attachment section disposed in approximately ⅔ of the body of the charging apparatus 100. This battery attachment section 101 is divided into a first battery attachment section 101A and a second battery attachment section 101B. The first battery attachment section 101A and the second battery attachment section 101B are each capable of holding rows of two AA rechargeable batteries. A cover 102 is provided for the battery attachment section 101, which is installed in a manner allowing it to open and close freely. This cover also serves a dual purpose as a switch to initiate charging. When the cover 102 is closed charging is started, and when the cover 102 is opened charging is stopped. A power supply enclosure 103 is disposed adjacent to the first battery attachment section 101A in approximately ⅓ of the body of the charging apparatus 100. First and second charging indicator lamps 104A, 104B are exposed through the front surface of the power supply enclosure 103. The first and second charging indicator lamps 104A and 104B are lighted during charging of rechargeable batteries in the first and second battery attachment sections 101A and 101B respectively, and are turned off when respective charging operations are complete.

FIGS. 2 and 3 are lengthwise and lateral cross-section views of the body of the charging apparatus 100. A power supply plug 105 disposed on the backside of the power supply enclosure 103 in a manner allowing it to rotate freely. When charging is performed, the power supply plug 105 is rotated out and inserted into a 100V (120V) AC outlet. Thermistors 106A, 106B are positioned between the two rechargeable batteries in each of the first and second battery attachment sections 101A and 101B respectively. A printed circuit board 107 enclosed within the body of the charging apparatus 100 for attachment of circuit elements, etc.

Charging contacts 108 are attached to the printed circuit board 107. The charging contacts 108 are uncovered by exposing holes in the battery attachment section 101 to allow electrical contact with the rechargeable batteries. 109 represents colored regions disposed around charging contact 108 attachment points. Specifically, these colored regions 109 are formed slightly larger than the area of printed circuit board 107 visible through the exposing holes which uncover the charging contacts 108, and are essentially the same color as the body of the charging apparatus 100. Consequently, the printed circuit board 107 is not conspicuous when viewed through the exposing holes which uncover the charging contacts 108.

Figure 4:
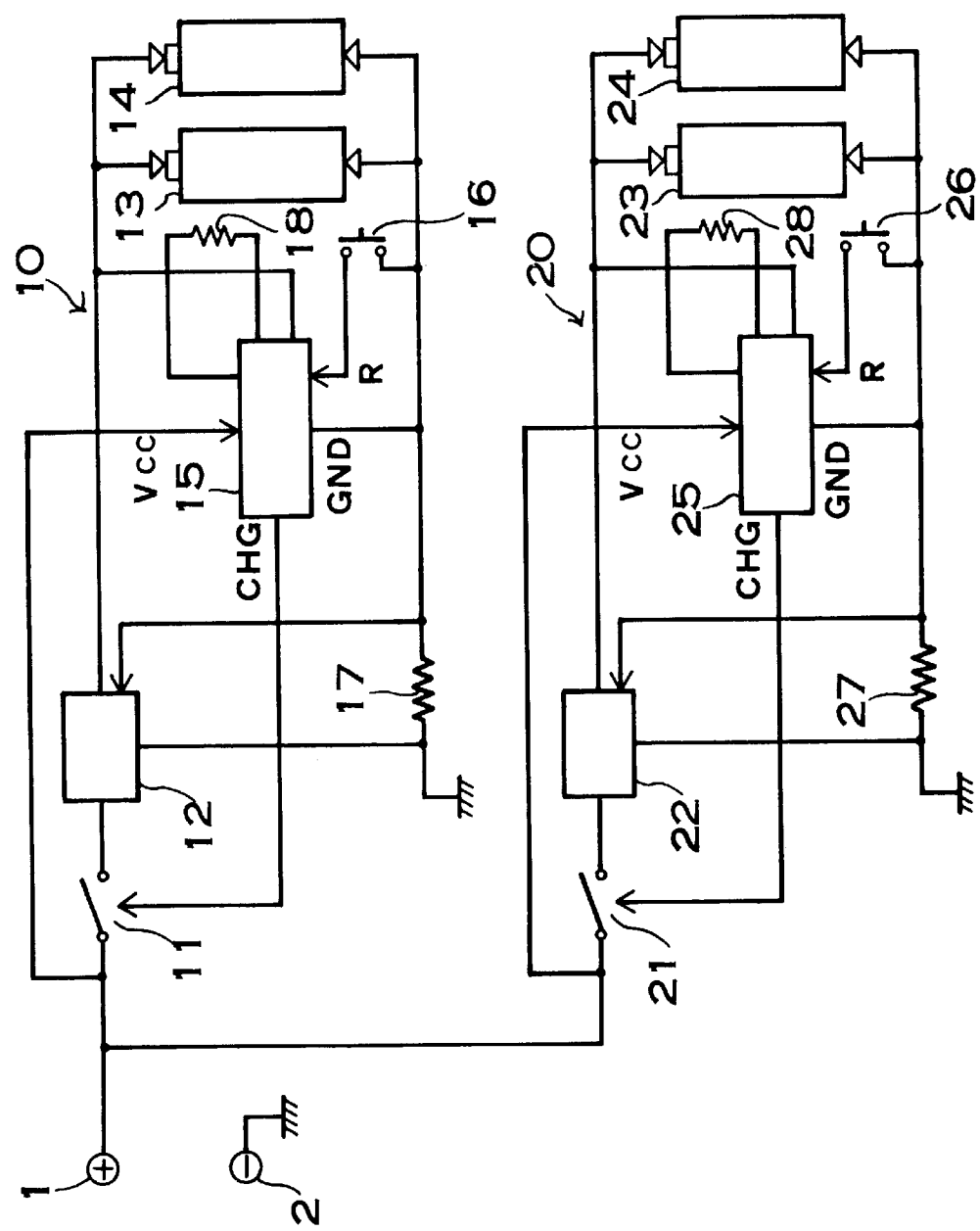
FIG. 4 is a block circuit diagram showing an embodiment of the present invention.

Turning to FIG. 4, a block circuit diagram is shown. In FIG. 4, 1 and 2 are power input terminals connected to the power supply plug 105, and 10 and 20 are charging circuits of the same design which are connected in parallel with respect to the power input terminals 1 and 2.

Charging switches 11, 21 such as metal oxide semiconductor field effect transistors (MOSFETs) open and close the charging circuits 10 and 20. Power supply circuits 12, 22 convert power input through the power input terminals 1 and 2 to DC output of a specified value. Here, the power output from power supply circuit 12 and from power supply circuit 22 has the same voltage, but the current output from power supply circuit 12 is set slightly higher. First and second rechargeable batteries 13, 14 are loaded in the first battery attachment section 101A (refer to FIG. 1) in a detachable fashion and connected in parallel with respect to the power supply circuit 12. Third the third and fourth rechargeable batteries 23, 24 are loaded in the second battery attachment section 101B (refer to FIG. 1) in a detachable fashion and connected in parallel with respect to the power supply circuit 22.

A charging control circuit 15 measures the battery voltage of the first and second rechargeable batteries 13 and 14, and determines when battery voltage drops a specified amount from the peak voltage (namely, −DV) or when it reaches the peak voltage, and thereby determines when the first and second rechargeable batteries 13 and 14 reach full charge to control the charging switch 11. A charging control circuit 25, measures the battery voltage of the third and fourth rechargeable batteries 23 and 24, the determines when battery voltage drops a specified amount from the peak voltage (namely, -DV) or when it reaches the peak voltage, and thereby determines when the third and fourth rechargeable batteries 23 and 24 reach full charge to control the charging switch 21.

Cover switches 16 and 26 are linked to the opening and closing of the cover 102 (refer to FIG. 1). When cover switch 16 is put in the closed position, charging control circuit 15 is activated; when the cover switch 16 is put in the open position, charging control circuit 15 is reset and its operation is stopped. Similarly, when cover switch 26 is put in the closed position, charging control circuit 25 is activated; when the cover switch 26 is put in the open position, charging control circuit 25 is reset and its operation is stopped.

Here, the cover switches 16 and 26 may be provided in the first attachment section 101A and in the second attachment section 101B to open and close directly depending on whether or not rechargeable batteries are loaded in the respective attachment section.

Current sensing resistors 17 and 27 are provided to measure charging current flowing in the charging circuits 10 and 20. The power supply circuits 12 and 22 regulate constant current output based on signals obtained from the current sensing resistors 17 and 27.

Thermistors 18 and 28 are provided in the first battery attachment section 101A and in the second battery attachment section 101B to measure battery temperature of rechargeable batteries in respective attachment sections. (These thermistors 18 and 28 are shown as thermistors 106A and 106B in FIG. 2.)

The following describes the operation of this circuitry. First, the first through fourth rechargeable batteries 13, 14, 23, and 24 are attached in the battery attachment section 101 and the cover 102 is closed. In this state, the cover switches 16 and 26 are in the closed position and charging control circuits 15 and 25 are activated. When the power supply plug 105 is inserted into a 100V (120V) AC outlet, signals are issued from the CHG terminals of the charging control circuits 15 and 25. Consequently, charging switches 11 and 21 are closed and the first through fourth rechargeable batteries 13,14, 23, and 24 begin charging.

Under these charging conditions, charging of the first and second rechargeable batteries 13 and 14 in the first battery attachment section 101A progresses faster than charging of the third and fourth rechargeable batteries 23 and 24 in the second battery attachment section 101B because the output current of power supply circuit 12 is greater than that of power supply circuit 22. When a voltage drop (-DV) or a peak voltage is detected for the first and second rechargeable batteries 13 and 14 in the first battery attachment section 101A, the charging control circuit 15 determines that full charge has been reached. The charging control circuit 15 then opens the charging switch 11 to end charging and also turns off the first charging indicator lamp 104A.

Meanwhile, charging of the third and fourth rechargeable batteries 23 and 24 in the second battery attachment section 101B continues. Subsequently, when a voltage drop (-DV) or a peak voltage is detected for the third and fourth rechargeable batteries 23 and 24 in the second battery attachment section 101B, the charging control circuit 25 determines that full charge has been reached. The charging control circuit 25 then opens the charging switch 21 to end charging and also turns off the second charging indicator lamp 104B.

In this embodiment as described above, the first and second rechargeable batteries 13 and 14 in the first battery attachment section 101A adjacent to the power supply enclosure 103 are the first to reach full charge, and the third and fourth rechargeable batteries 23 and 24 in the second battery attachment section 101B separated from the power supply enclosure 103 reach full charge subsequently. Therefore, the first and second rechargeable batteries 13 and 14, which receive the effects of radiated heat from the power supply enclosure 103 in addition to self heating during charging and which have the possibility of getting abnormally hot, are cooling while the third and fourth rechargeable batteries 23 and 24 are charging.

On the other hand, since the third and fourth rechargeable batteries 23 and 24 are separated from the power supply enclosure 103, they do not receive the effects of radiated heat from the power supply enclosure 103. Therefore, the third and fourth rechargeable batteries 23 and 24 do not get abnormally hot.

Incidentally, thermistors 18 and 28 sense the battery temperature of the first and second rechargeable batteries 13 and 14 in the first battery attachment section 101A and the third and fourth rechargeable batteries 23 and 24 in the second battery attachment section 101B respectively. As shown in FIG. 2, these thermistors 18 and 28 are disposed between the two rechargeable batteries in the first and second battery attachment sections 101A and 101 B. Consequently, the temperature of two rechargeable batteries can be sensed with one thermistor and the number of component parts can be reduced.

If thermistor 18 measures the first or second rechargeable batteries 13 and 14 at temperatures above a specified temperature (for example, 60° C.), the charging control circuit 15 suspends charging (or reduces charging current) until the temperature of rechargeable batteries 13 and 14 has dropped below the specified temperature. Similarly, if thermistor 28 measures the third or fourth rechargeable batteries 23 and 24 at temperatures above a specified temperature (for example, 60° C.), the charging control circuit 25 suspends charging (or reduces charging current) until the temperature of rechargeable batteries 23 and 24 has dropped below the specified temperature.

In the present invention, when the first through fourth rechargeable batteries 13, 14, 23, and 24 have all reached full charge and are ready for removal, none of these batteries 13, 14, 23, and 24 are in an abnormally high temperature state. To realize this in the embodiment described above, the first and second rechargeable batteries 13 and 14 in the first battery attachment section 101A next to the power supply enclosure 103 reach full charge first. Then while the third and fourth rechargeable batteries 23 and 24 are being charged, the first and second rechargeable batteries 13 and 14 are cooling.

In the embodiment described above, the charging current for the first and second rechargeable batteries 13 and 14 in the first battery attachment section 101A and the charging current for the third and fourth rechargeable batteries 23 and 24 in the second battery attachment section 101B are set different to offset the timing for reaching full charge. However, it is also possible to set the charging currents equal and offset the timing for starting charging (namely, start charging the first and second rechargeable batteries 13 and 14 in the first battery attachment section 101A first).

Further, in the embodiment described above, it may be more suitable if the first and second charging indicator lamps 104A and 104B remain lighted until the third and fourth rechargeable batteries 23 and 24 have reached full charge (namely, until all rechargeable batteries have reached full charge).

The following describes other embodiments of the present invention. First, as a second embodiment, the first and second charging indicator lamps are turned off to indicate full charge after the first through fourth rechargeable batteries have reached full charge, and when the temperature of all rechargeable batteries has dropped below a specified temperature (for example, 55° C.) or when the temperature has dropped a specified amount from the temperature at the time full charge was reached.

As a third embodiment, the first and second charging indicator lamps are turned off to indicate full charge after the first through fourth rechargeable batteries have reached full charge and a specified time period has elapsed.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery charging apparatus comprising:
(1) a charging power supply for providing electric power to charge rechargeable batteries;
(2) a first battery attachment section positioned adjacent to said charging power supply;
(3) a second battery attachment section positioned adjacent to said first battery attachment section so as to be separated from said charging power supply by said first battery attachment section; and
(4) a charging controller which fully charges a rechargeable battery attached to said first battery attachment section faster than a battery attached to said second battery attachment section, wherein the battery attached to said first battery attachment section is the same type of battery as the battery attached to said second battery attachment section.

2. A battery charging apparatus as claimed in claim 1, wherein a charging current for the rechargeable battery attached to said first battery attachment section is greater than a charging current for the rechargeable battery attached to said second battery attachment section such that said charging controller fully charges the rechargeable battery attached to said first battery attachment section before fully charging the rechargeable battery attached to said second battery attachment section.

3. A battery charging apparatus as claimed in claim 1, wherein the charging controller is operable to offset the timing for initiating charging such that the rechargeable battery attached to said first battery attachment section will reach full charge before the rechargeable battery attached to said second battery attachment section.

4. A battery charging apparatus as claimed in claim 1, wherein said first and second battery attachment sections are configured to receive rechargeable batteries therein in a parallel orientation.

5. A battery charging apparatus as claimed in claim 1, wherein said battery charging apparatus is a nickel-cadmium battery charging apparatus.

6. A battery charging apparatus as claimed in claim 1, wherein said battery charging apparatus is a nickel-hydrogen battery charging apparatus.

7. A battery charging apparatus comprising:
(1) a charging power supply for providing electric power to charge rechargeable batteries;
(2) a first battery attachment section positioned adjacent to said charging power supply;
(3) a second battery attachment section positioned adjacent to said first battery attachment section, wherein said second battery attachment section is disposed on an opposite side of said first battery attachment section relative to said charging power supply;
(4) a charging controller which is operable to fully charge a rechargeable battery attached to said first battery attachment section faster than a rechargeable battery attached to said second battery attachment section without regard to the type of rechargeable battery attached to said first battery attachment section;
(5) a first charging indicator for displaying an indication of the state of charge of the rechargeable battery attached to said first battery attachment section; and
(6) a second charging indicator for displaying the state of charge of the rechargeable battery attached to said second battery attachment section, wherein said first and second charging indicators display full charge after all of the rechargeable batteries in said first and second battery attachment sections have reached full charge.

8. A battery charging apparatus as claimed in claim 7, wherein said first and second charging indicators comprise a first charging indicator lamp and a second charging indicator lamp, respectively.

9. A battery charging apparatus as claimed in claim 8, wherein said first and second charging indicator lamps are lighted while the rechargeable batteries in said first and second battery attachment sections are being charged, and said first and second charging indicator lamps are turned off to indicate full charge upon completion of a charging operation.

10. A battery charging apparatus as claimed in claim 7, wherein said battery charging apparatus is a nickel-cadmium battery charging apparatus.

11. A battery charging apparatus as claimed in claim 7, wherein said battery charging apparatus is a nickel-hydrogen battery charging apparatus.

12. A battery charging apparatus comprising:
   a charging apparatus body including a power supply enclosure, a first battery attachment section, a second battery attachment section, wherein said first battery attachment section is disposed adjacent said power supply enclosure and said second battery attachment section is separated from said power supply enclosure;
   a power supply plug pivotally mounted on said power supply enclosure; and
   a charging controller including power input terminals connected to said power supply plug, first and second parallel charging circuits connected to said first and second battery attachment sections, respectively,
   wherein current output from said first charging circuit is always higher than current output from said second charging circuit such that a rechargeable battery in said first battery attachment section charges faster than a rechargeable battery in said second battery attachment section.

13. A battery charging apparatus as claimed in claim 12, further comprising:
   a first charging indicator for displaying an indication of the state of charge of the rechargeable battery attached to said first battery attachment section; and
   a second charging indicator for displaying the state of charge of the rechargeable battery attached to said second battery attachment section, wherein said first and second charging indicators display full charge after all of the rechargeable batteries in said first and second battery attachment sections have reached full charge.

14. A battery charging apparatus as claimed in claim 13, wherein said first and second charging indicators comprise a first charging indicator lamp and a second charging indicator lamp, respectively.

15. A battery charging apparatus as claimed in claim 12, wherein said first and second charging indicator lamps are lighted while the rechargeable batteries in said first and second battery attachment sections are being charged, and said first and second charging indicator lamps are turned off to indicate full charge upon completion of a charging operation.

16. A battery charging apparatus as claimed in claim 12, wherein said battery charging apparatus is a nickel-cadmium battery charging apparatus.

17. A battery charging apparatus as claimed in claim 12, wherein said battery charging apparatus is a nickel-hydrogen battery charging apparatus.

* * * * *